United States Patent [19]

Uchidoi et al.

[11] 3,922,078

[45] Nov. 25, 1975

[54] EQUIPMENT TO SYNCHRONIZE PICTURES WITH SOUNDS

[75] Inventors: Masanori Uchidoi, Kawasaki; Yoshihiro Shigeta, Tokyo, both of Japan

[73] Assignee: Canon Kabushiki Kaisha, Tokyo, Japan

[22] Filed: Sept. 4, 1973

[21] Appl. No.: 393,920

[30] Foreign Application Priority Data

Sept. 5, 1972 Japan .................................. 47-88847

[52] U.S. Cl. ........................ 353/15; 353/16; 353/18; 352/5; 352/12; 352/15; 352/31

[51] Int. Cl.$^2$ ........................................ G03B 31/04

[58] Field of Search .............. 353/15, 16, 18; 352/5, 352/12, 15, 19, 23, 24, 31

[56] References Cited

UNITED STATES PATENTS

| | | | |
|---|---|---|---|
| 3,259,011 | 7/1966 | Yamada | 353/15 |
| 3,612,675 | 10/1971 | Ruta | 353/15 |
| 3,620,609 | 11/1971 | John | 353/15 |
| 3,690,746 | 9/1972 | Kotler et al. | 352/31 |

*Primary Examiner*—Richard E. Aegerter
*Assistant Examiner*—Larry Jones
*Attorney, Agent, or Firm*—Torne, McGeady and Stanger

[57] ABSTRACT

The present invention refers to equipment to synchronize the pictures with the sounds, with which equipment the difference between the pictures of a slide projector or the like and the sounds of the corresponding tape recorder is corrected. The invention is characterized in that at the position of the sound recording tape corresponding to N pictures, a signal corresponding to the picture and on the Nth picture a signal corresponding to the sound recording tape is provided, whereby by means of the output of an electrical circuit to detect the coincidence of both signals, the switching over to the next picture or the sound recording tape is carried out. At the position of the sound recording tape corresponding to the first or the last picture, a signal corresponding to a picture and on the first or the last picture a signal corresponding to the sound recording tape is provided and that by means of an electric circuit to detect the coincidence of both signals, the switching over to the next picture of the sound recording tape is carried out.

33 Claims, 5 Drawing Figures

EQUIPMENT TO SYNCHRONIZE PICTURES WITH SOUNDS

BACKGROUND OF THE INVENTION

Field of the Invention

The present invention relates to an equipment to synchronize the pictures with the sounds with which equipment the difference between the pictures of slide projector or the like and the sounds of the corresponding tape recorder is corrected.

Until now many equipment with which the pictures of slide projectors or the like and the sound of the corresponding tape recorder are synchronized with each other have been known, while on the other hand only a very few equipments to synchronize the pictures and the sounds which are equipped with a means to correct the difference between the pictures and the sounds when they go out of synchronization have been known. In the case of the conventional equipment to synchronize the pictures and the sounds, generally a signal to actuate the slide operation of the slide projector or the like is stored on the tape side of the tape recorder in such a manner that the stored signal is picked up by the magnetic head during the running of the tape, whereby a signal to actuate the slide operation is conveyed to the slide the like or thelike from the tape recorder. However in the case of the equipment of this kind, the signal stored in tape is picked up by the magnetic head, whereby it often happens that noises erroneously stored in the tape or the noise signal from without are also picked up and the slide projector is actuated. Thus it is often unavoidable that the pictures of the slide projector of the like and the sounds of the tape recorder go out of synchronization. However the conventional equipment is not equipped with a means to restore synchronization when it is out of it, the synchronization is obtained manually, which is very troublesome.

The first purpose of the present invention is to offer an equipment to synchronize the pictures and the sounds which equipment automatically detects the difference between the pictures of the slide projector or the like and the sounds of the corresponding tape recorder and restores the synchronization when such difference takes place.

The second purpose of the present invention is to offer an equipment to synchronize the pictures and the sounds which equipment detects any difference and restores the synchronization at the beginning or at the end of the endless tape or the endless film without fail when the continuous projection is carried out with the endless tape or the endless film.

The third purpose of the present invention is to offer an equipment to synchronize the pictures and the sounds which equipment automatically detects the difference between the pictures of the slide projector or the like and the sound of the corresponding tape recorder when the difference takes place.

BRIEF DESCRIPTION OF THE DRAWING

The drawings show respectively each case of the present invention in which the equipment for synchronizing pictures with sounds is applied to a projector which carries out still projection using strip film.

However the present invention is not limited only to the projector which carries out the still projection of strip film and can also be applied on the slide projector or the like which utilize the cut film. Accordingly the claim of the present invention is not limited only to the projector which carries out the still projection of strip film.

DESCRIPTION OF THE PREFERRED EMBODIMENTS

Figure 1:
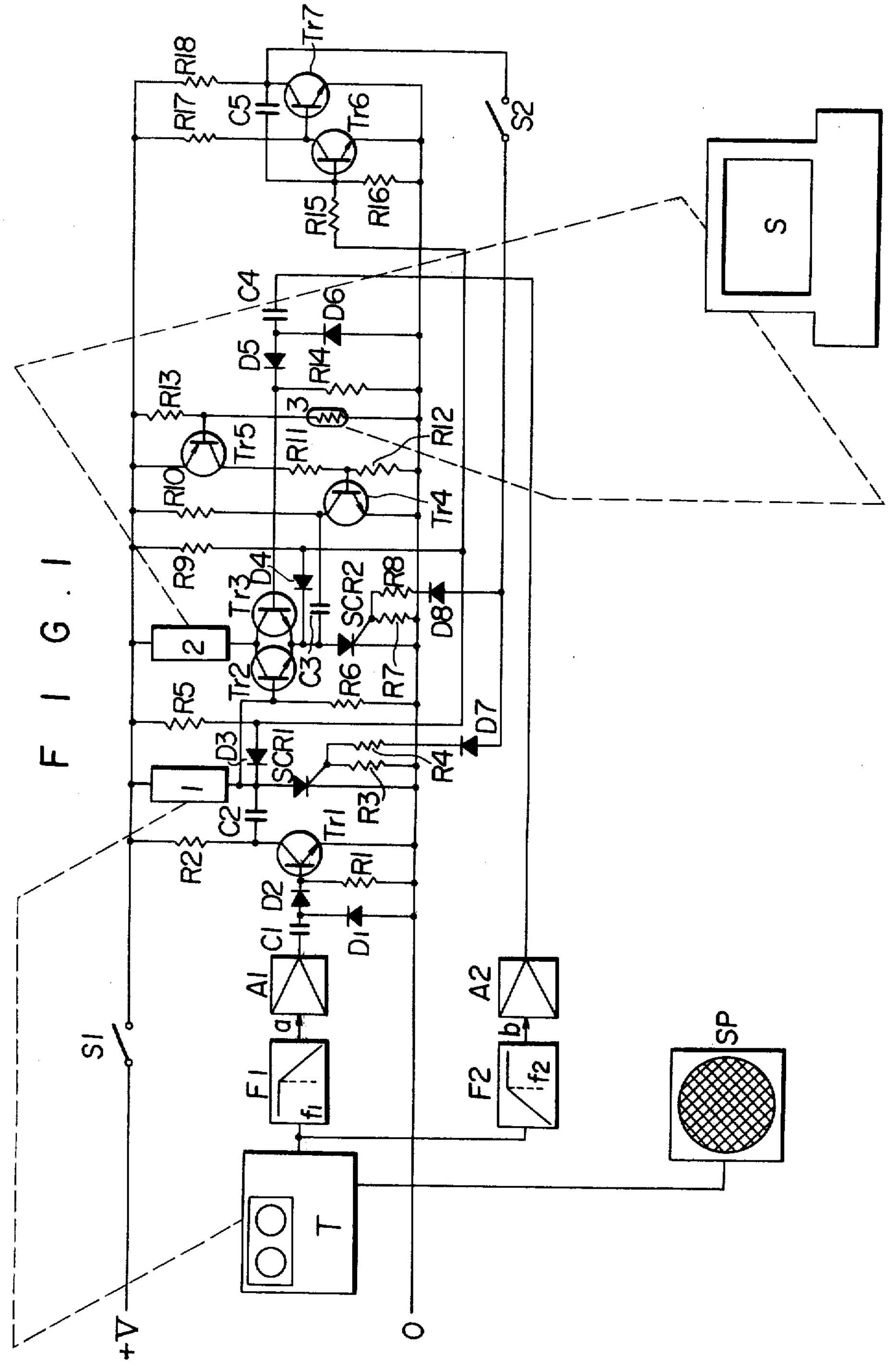
FIG. 1 shows a circuit composition of the equipment to synchronize the picture and the sounds with which equipment the difference between the pictures of the projector which carries out the still projection of strip film and the sounds of the corresponding tape recorder can be balanced.
Figure 4:
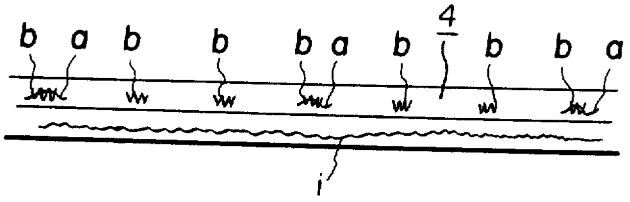
FIG. 4 shows the distribution of the signals stored on the sound recording tape of the tape recorder preferred to the equipment to synchronize the pictures and the sounds.
Figure 5:
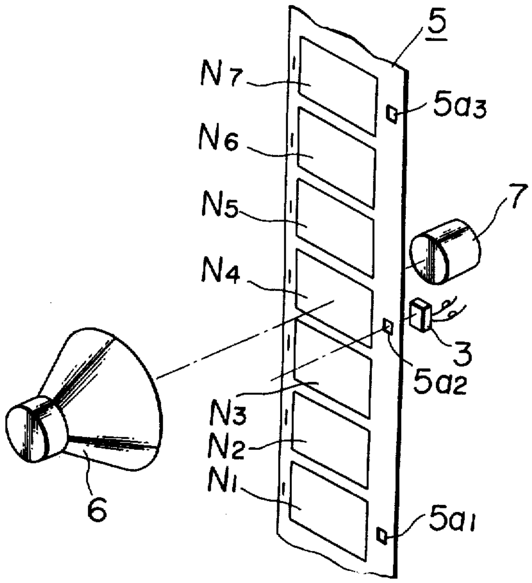
FIG. 5 shows an embodiment to read a signal 5*a* stored on the strip film preferred to the equipment according to the present invention to synchronize the pictures and the sounds in perspective view, whereby 6 is a light source while 7 the option of the projector.

In the embodiment shown in FIG. 1, is a projector which carries out a still projection using a strip film 5 shown in FIG. 5. This strip film 5 is made, as shown in FIG. 5, in such a manner that, the parts other than the part in which the picture information is stored do not allow the light coming from the light source 6 for projection to pass, and on the side opposite to the side having film perforations, are formed openings 5*a*, 5*b*, 5*c* . . . for passing light from said light source 6 to the position corresponding to each N-th frame of the pictures as a mark for synchronization. 7 in FIG. 5 is an optical system for projection. T is a tape recorder which gives explanations corresponding to pictures projected by said projector S, using a sound recorded tape 4 shown in FIG. 4. This sound recorded tape 4 has, on a part thereof, as shown in FIG. 4, a sound signal *i* corresponding to image information of the strip film 5, and, on a part different from the part in which this sound signal *i* is stored, signals *b* for picture-changing existing in the positions corresponding to each frame of the images, and signals *a* for correcting synchronization delay existing in the positions corresponding to the openings 5*a*, 5*b*, 5*c* . . . formed on the film 5, are stored respectively with different frequencies $f_1$, $f_2$.

SP is a speaker, 1 is a feeding means of the sound recording tape 4, 2 is an exchange means of the frame, 3 is a photo-electric means for receiving the light from the light source 6 arriving through any one of the openings 5*a*, 5*b*, 5*c* . . . of the film 5, at every time the picture changes by N frames. $S_1$ and $S_2$ are switches, R is a resistance, C is a condensor, *Tr* is a transistor, SCR is a thyristor, D is a diode, F is a filter and A is an amplifier.

When the main switch $S_1$ is closed, a base current flows to the transistor $Tr_6$ through the resistances $R_5$, $R_9$ and $R_{15}$ in such a manner that the transistor $Tr_6$ is brought into the conductive state while the transistor $Tr_7$ is brought out of the conductive state so that the collector of the transistor $Tr_7$ remains positive. When the start switch $S_2$ is pushed down, the collector of the transistor $Tr_7$ and the gates of the thyristors $SCR_1$ and $SCR_2$ are connected with each other through the diode 7, the resistance $R_4$, the diode $D_8$ and the resistance $R_8$, in such a manner that both thyristors are brought into a conductive state, which state is maintained by the resistances $R_5$ and $R_9$.

When the thyristor $SCR_1$ is brought into a conductive state, a current flows by the tape feed means 1 of the tape recorder T so that the tape recorder T starts its operation. The signal *b* sent from the sound recording tape 4 for every picture flows through the filter $F_2$ and the amplifier $A_2$, is rectified by the condensor $C_4$ and the diodes $D_5$ and $D_6$ and flows to the base of the transistor $Tr_3$ so that the transistor $Tr_3$ is brought into the conductive state in such a manner that the slide changing means 2 is put into operation so as to change the slide of the strip film.

By means of the signal *b* for each slide the above mentioned slide changing means 2 is put into and out of operation, whereby on reading the Nth slide the tape recorder T sends a signal *a* for the Nth slide and a signal *b*. The signal *a* is rectified by a condensor $C_1$ and the diodes $D_1$ and $D_2$ and flows to the base of the transistor $Tr_1$ in such a manner that the transistor $Tr_1$ is brought into a conductive state. Accordingly the potential at the collector of the transistor $Tr_1$ is lowered, while by means of the condensor $C_2$ the potential at the anode of the thyristor $SCR_1$ is also lowered in such a manner that the thyristor is brought out of the conductive state. Thus the potential at the anode of the thyristor $SCR_1$ is raised, while a current flows to the base of the transistor $Tr_2$ in such a manner that the transistor $Tr_2$ is brought into a conductive state so that the slide changing means 2 is supplied with a current so as to change the frame S. Though at this time the signal *b* for the Nth frame brings the transistors $Tr_3$ and $Tr_2$ into the conductive state at the same time, there is no trouble with it.

When there is no difference between the slide of the strip film 5 and the sound of the tape, at the above mentioned slide change the Nth slide of the strip film 5 is projected, while the photoelectric means 3 receives a light from the light source through one of the openings 5*a* 5*b*, 5*c* provided at a part of the Nth slide in such a manner that the transistors $Tr_5$ and $Tr_4$ are brought into a conductive state and by means of the condensor $C_3$ the potential of the anode of the thyristor $SCR_2$ is lowered so that the thyristor $SCR_2$ is brought out of the conductive state.

If the switch $S_2$ is on the state "Off" when both thyristors $SCR_1$ and $SCR_2$ are together in the state Off, the projector and the tape recorder T stop, maintaining the waiting state. However, if the switch $S_2$ is in the "On" state, as is the situation at the starting by means of the resistances $R_5$, $R_9$ and $R_{15}$, the transistors $Tr_6$ is brought into a conductive state, the transistor $Tr_7$ out of the conductive state and the thyristors $SCR_1$ and $SCR_2$ into a conductive state in such a manner that the aforementioned operation is repeated.

On the other hand the operation when there is a difference between the slide of the strip film 5 and the sound of the tape, is as follows. 1. In case the slide of the strip film 5 is in advance as compared with the sound of the tape.

When the Nth slide of the strip film appears the photoelectric means 3 receive the light from the light source 6 through one of the openings 5*a*, 5*b*, 5*c* and the thyristor $SCR_2$ is brought out of the conductive state in such a manner that, although by means of the signal *b* for each slide reaches from the tape recorder and the transistor $Tr_3$ is brought into a conductive state, no current flows to the slide changing means 2. Namely the slide is not changed, waiting for the sound recording tape to catch up with the slide.

When the sound recording tape catches up with the slide and by means of the signal *a* for correcting the difference, the thyristor $SCR_1$ is brought out of the conductive state, both thyristors $SCR_1$ and $SCR_2$ assume the initial state so, that if the switch $S_2$ is not in the Off state at this moment, a gate current flows from the collector of the transistor $Tr_7$ in such a manner that the operation is started so as to continue the projection. 2. In case the sound of the tape is in advance as compared with the slide of the strip film 5.

The signal *a* from the sound recording tape for correcting the difference appears in advance and as in the aforementioned order the thyristor $SCR_1$ is brought out of the conductive state and the tape feed means stops its operation. However by the fact that the potential at the anode of the thyristor $SCR_1$ is raised, the transistor $Tr_2$ is brought into a conductive state and the slide change means 2 is switched on so that the slide of the strip film 5 is changed. When the slide catches up with the sound of the tape after repetition of the slide changes the photoelectric means 3 receives the light and the thyristor $SCR_2$ is brought out of the conductive state, assuming the initial state.

Figure 2:
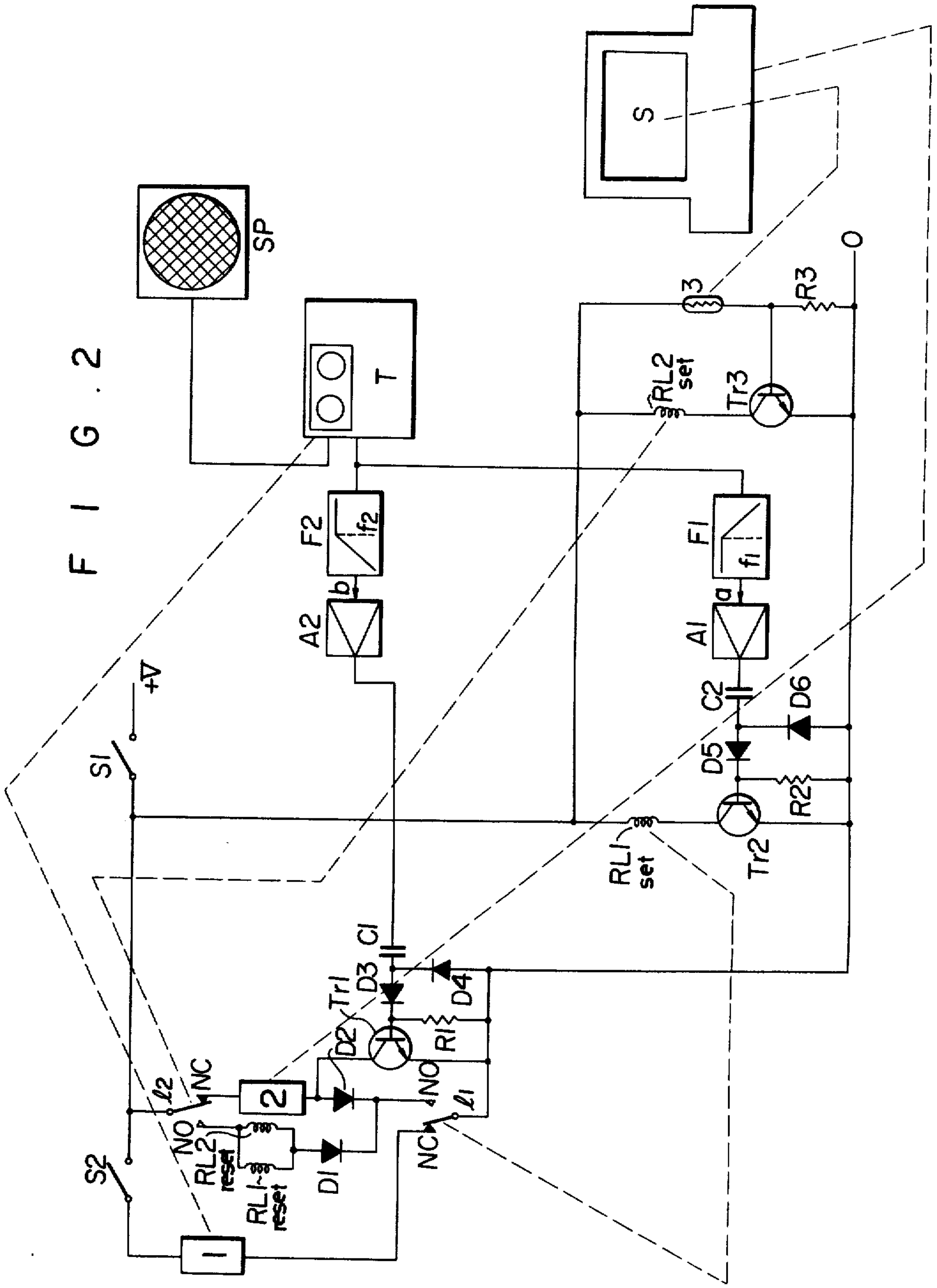
FIG. 2 shows a circuit disposition of another embodiment of the equipment according to the present invention to synchronize the pictures and the sounds.

In FIG. 2 a circuit composition in which a self-holding relay $R_2$ (whose contact 1 is ordinarily in contact with the NC side, and switched over to the NO side if the electric current is passed through the setting coil) is used is shown, whereby the operation is same as the aforementioned embodiment.

When the main switch S, and the starting switches $S_2$ are closed a current flows through the sound recording tape feeding means 1 in such a manner that the tape recorder T starts its operation, whereby by means of the frame changing signal *b* of the sound recording tape 4 for feeding the slide of the sound recording tape 4 the transistor $Tr_1$ is brought into a conductive state in such a manner that a current flows through the slide changing means 2 so that the slide of the strip film 5 is changed. When the signal *a* for correcting the difference and the transistor $Tr_2$ is brought into a conductive state, a current flows through the setting coil of the self-holding relay $RL_1$ in such a manner that the contact $l_1$ of the self-holding relay $RL_1$ is switched on NO side.

At this time a current flows to the slide changing means 2 through $l_2$ - NC and $l_1$ - NO in such a manner that the slide of the strip film 5 is changed. When the Nth slide appears the photoelectric means 3 receives a light in such a manner that the transistor $Tr_3$ is brought into a conductive state so that a current flows through the setting coil of the self-holding relay $RL_2$, whereby the contact $l_2$ of the relay $RL_2$ is switched on the NO side in such a manner that a current flows to the resetting coils of the relays $RL_1$ and $RL_2$ through $l_2$ - NO and $l_1$ - NO so that the contacts $l_1$ and $l_2$ are switched on NC side and the initial starting state is restored. If the switch $S_2$ is in the Off state at this moment, the projector S and the tape recorder T come to a stop, maintaining the waiting state; if the switch $S_2$ is in the ON state, the operation until this moment is repeated.

When the slide of the strip film 5 is in advance, at the N-th slide the photoelectric means 3 receives the light from the light source 6 through one of the openings 5*a*, 5*b*, 5*c* in such a manner that the relay $RL_2$ is set while the contact $l_2$ is switched on the NO side so that the slide changing means 2 does not operate even if a signal *b* for the frame arrives.

When the sound recording tape 4 catches up with the picture of the strip film 5, by means of the signal *a* for correcting the difference the relay $RL_1$ is set, and the contact $l_1$ is thereby switched on the NO side in such a manner the resetting coils of the relay $RL_1$ and $RL_2$ are passed with electric current and the relays $RL_1$ and $RL_2$ are reset, the contact $l_1$ and $l_2$ being thereby switched on the NC side, and the initial starting state is restored so that the synchronization operation is repeated.

In case the slide of the strip film is in delay, by means of the signal *a* the relay $RL_1$ is set in advance and a current flows to the slide changing means 2 through $l_1$ - NO in such a manner that the slide of the strip film 5 is changed. (At this moment the tape 4 stops and waits until film 5 catches up). The slides are changed until the slide of the strip film 5 catches the sound of the corresponding sound recording tape and when the slide of the strip film 5 catches the corresponding sound recording tape, the photoelectric means 3 receives the light in such a manner that the relay $RL_2$ is set and the contact is thereby switched to the NO side. Accordingly, the relays $RL_1$ and $RL_2$ and the contacts $l_1$ and $l_2$ are thereby switched on the NC side so that the initial state is restored for synchronization.

Figure 3:
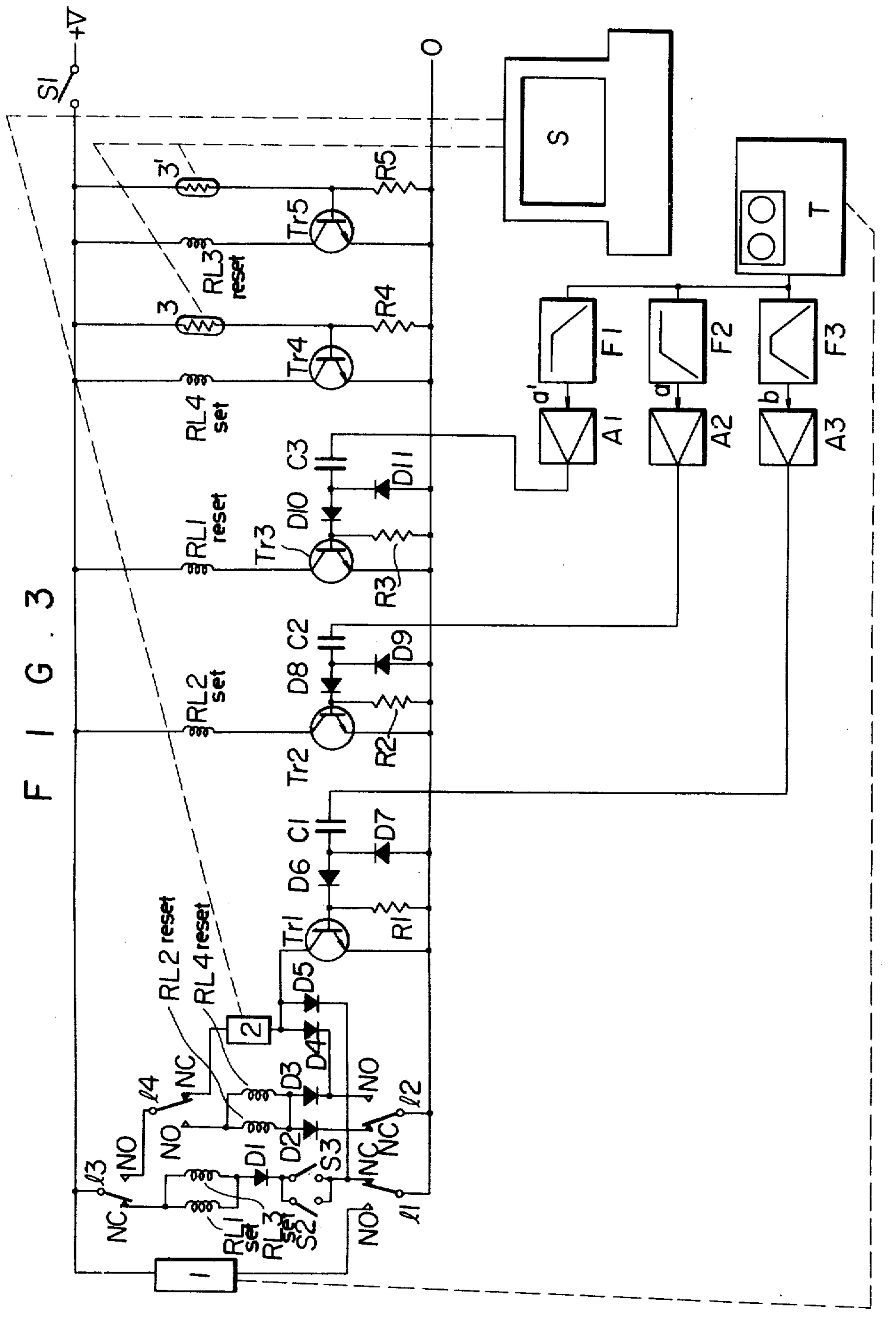
FIG. 3 shows a circuit disposition of further embodiment of the equipment according to the present invention to synchronize the pictures and the sounds, whereby no-manoperation is realized with the endless tape and the endless film.

In FIG. 3 is shown a means to correct such a large difference as cannot be corrected every Nth slide as is shown in FIG. 1 and FIG. 2, whereby the correction is carried out by another signal *a'* stored on the tape at a position which corresponds to an initial frame of the film.

In case for example, a repeated projection is made of the endless tape or the endless film without operator, there occurs often the case by means of the signal *a* of the aforementioned circuit and the operation of the light receiving means 3 namely, by means of the correction at every Nth slide the correction cannot be obtained, which is very inconvenient. In such a case it is given up to carry out the correction of one cycle of the projection, whereby the sound recording tape and the film are let go in the state out of the synchronization and at the initial state of the sound recording tape and the film the correction is carried out.

This correcting system is very effective in case the endless sound recording tape and the endless film are used.

$S_3$ is a switch which switches the repeated and continuous projection, in which an endless sound recording tape and an endless film are used, over to the ordinary projection in which only one projection is carried out. 3' is a photoelectric means to receive a light only when the initial slide appears.

When the main switch $S_1$ starting switch $S_2$ are closed a current flows to the setting coils of the relays $RL_1$ and $RL_3$ through in such a manner that he contacts $l_1$ and $l_3$ are switched on the NO side. By this, the tape feed means 1 is put into operation so that the tape recorder T starts its operation. By means of the signal *b* for feeding one slide, the transistor $Tr_1$ is brought into a conductive state and the slide changing means 2 is also brought into a conductive state so that at every signal *b* the slide of the strip film 5 is changed.

When the slide of the strip film 5 is in advance, the photoelectric means 3 receives the light every Nth slide so that when the transistor $Tr_4$ is brought into a conductive state the relay $RL_4$ is set while the contact $l_4$ is switched on NO side the circuit of the slide changing means 2 is interrupted so that evenn with the signal *b* the slide of the strip film 5 is not changed. When the sound recording tape 4 catches up, by means of the signal *a* for correction at every Nth slide the transistor $Tr_2$ is brought into a conductive state and the relay $RL_2$ is set so that the contact $l_2$ is switched on NO side, while the contacts $l_3$, $l_4$and $l_2$ are respectively switched on NO side in such a manner that the resetting coils of the relays $RL_2$ and $RL_4$ are passed with electric current so that the relays $RL_2$ and $RL_4$ are reset and the contact $l_2$ and $l_4$ are thereby switched on the NC side whereby by the fact that the contact $l_3$ is switched on NO side while the contact $l_4$ is switched on NC side and the transistor $Tr_1$ is brought into a conductive state by means of the signal *b* for feeding a slide the slide change means 2 is put in operation in such a manner that the synchronization is obtained.

When the slide of the strip film 5 is in delay, the signal *a* for correcting the difference of the tape 4, whereby when the transistor $Tr_2$ is brought into a conductive state and the relay $RL_2$ is set, the contact $l_2$ is switched on NO side in such a manner that a current flows to the means 2 through $l_3$ - NO, $l_4$ - NC and $l_2$- NO so that the pictures are changed irrespective of the signal *b*. until the slide of the strip film 5 catches up with the sound recording tape corresponding to the slide, and when the slide catches up with the sound recording tape, the photoelectric means 3 receives the light, the transistor $Tr_4$ is brought into a conductive state while the relay $RL_4$ is set so that the contact $l_4$ is switched on NO side in such a manner that the resetting coils of the relays $RL_2$ and the $RL_4$ are put in operation, whereby the contacts $l_2$ and $l_4$ are switched on the NC side šo as to restore synchronization.

In case the correction cannot be obtained by the correction by means of the above mentioned signal *a* for obtaining synchronization and the operation of the photoelectric means 3, namely, by the correction at every Nth slide.

Below the case when the switch $S_3$ is selected for the case in which a single projection is carried out, is explained. (Namely when the switch $S_3$ is opened) both relays $RL_1$ and $RL_3$ assume the reset state and both contacts $l_1$ and $l_3$ are switched on NC side, in which state, when the starting switch $S_2$ is pushed down the projection is, as aforementioned, started.

The case when the switch $S_3$ is selected for the repeated projection is as follows.

When the synchronization is maintained, a current flows to the setting coils of the relays $RL_1$ and $RL_3$ through the contact $l_3$, the diode $D_1$, the switch $S_2$ and the contact $l_1$ in such a manner that the contacts $l_2$ and $l_3$ are switched on NO side so as to resume the start from the beginning.

When the slide is in advance, the photoelectric means 3' is put in the operation by means of the light coming from the initial slide, whereby when the transistor $Tr_5$ is brought into a conductive state, the relay $RL_3$ is reset and the contact $l_3$ is switched on NC side, the current to the slide changing means 2 is interrupted. After then no current flows to the slide changing means 2 even if the signal for feeding the slide arrives from the tape, so that the slide is not changed. In this state only the sound recording tape continues to advance, whereby, when the portion of the sound recording tape A corresponding to the initial frame of the film 5 appears by means of the signal $a'$ on the sound recording tape the transistor $Tr_3$ is brought into a conductive state, the relay $RL_1$ is reset and the contact $l_1$ is switched on the NC side in such a manner that a current flows to the setting coils of the relays $RL_1$ and $RL_3$ through $l_3$ -NC, the diode $D_1$, the switches $S_2$ and $l_1$ - NC so that the relays $RL_1$ and $RL_3$ are set, and the contacts $l_1$ and $l_3$ are switched on the NO side so as to start from the beginning.

When the slide is in delay, by means of the signal $a'$ from the portion of the sound recording tape 4 corresponding to the initial frame of the film 5, the transistor $Tr_3$ is brought into a conductive state, the relay $RL_1$ is reset and the contact $l_1$ is switched on NC side, so that the sound recording tape feeding means 1 stops it operation, while at the same time a current flows to the slide changing means 2 through $l_3$ - NC, $l_4$ - NO, the diode $D_5$ and $l_1$ - NC in such a manner that the slides continues to be changed until the initial slide appears. When the initial slide appears, the photoelectric means 3' receives the light so that the transistor $Tr_5$ is brought into a conductive state, the relay $RL_3$ is reset and the contact $l_3$ is switched on NC side, whereby a current flows to the setting coils of the relays $RL_1$ and $RL_3$ through $l_3$ - NC, the diode $D_1$, the switch $S_2$ $S_3$ and $l_1$ - NC in such a manner that the contacts $l_1$ and $l_3$ are switched on NO sides and both film and sound recording tape start from the beginning. In this case the same effect can be obtained even if the signal $a'$ and the slide giving a light to the photoelectric means 3' are provided respectively on the last sound recording tape and the last slide even if the signal $a'$ is stored on the sound recording tape at a position which corresponds to a last frame of the film, and the photoelectric means 3' is made to receive light only when the last frame appears.

What is claimed is:

1. Equipment for use in combination with a visual display device, a sound information recording and playback device, sound information recording media, and image information recording media for synchronizing the image information of the image information recording media with sound information of the sound information recording media, said image information recording media being displayed by the visual display device and said sound information recording media being reproduced by the recording and playback device, said equipment comprising;

said image information recording media having a plurality of frames of image information, and being provided with a mark for synchronization corresponding to every Nth frame of said image information on said image information recording media;

means for detecting said mark and for producing a signal when said mark is detected;

said sound information recording media having first and second signals being stored thereon, said first signal for compensating for the delay of synchronization between said image information and said sound information and being stored in a position corresponding to the frame on which said mark of said image information recording media appears, said second signal for changing said image information frame-by-frame and being stored in a position corresponding to each frame of said image information;

first means responsive to said first signal and being operatively connected to said recording and playback device for permitting continued operation of said device and for stopping operation of said device;

second means responsive to said second signal and said signal produced by said detecting means and operatively connected to said visual display device for permitting continued operation of said device, said means operating so as to change said visual display device so that image information is regularly changed and simultaneously being capable of operating on said visual display device irrespective of said second signal to change said image information without correspondence to said sound information, the action of said second means being stopped in accordance with the signal from said detecting means; and an actuating means operatively connected to said first and second means for starting said first and second means when said first and second means jointly stop their action.

2. Equipment as claimed in claim 1, said first means including:

a switching means responsive to said first signal and at the same time operatively connected to said actuating means, said switching means actuating said first means by the action of said actuating means and stopping the operation of said first means in accordance with said first signal.

3. Equipment claimed in claim 1, said second means including:

a first switching means responsive to the signal produced from said detecting means and at the same time operatively connected to said actuating means, said switching means making said second means operative by the action of said actuating means and stopping the operation of said second means in accordance with the signal produced from said detecting means; and a second switching means responsive to said second signal and at the same time connected to said first switching means, said second switching means being cooperative with said first switching means in accordance with said second signal for actuating said second means.

4. Equipment claimed in claim 3, said second means further including:

a third switching means connected to said first switching means so as to be in parallel with said second switching means, said third switching means cooperating with said first switching means during the time said first means stops its operation for actuating said second means irrespective of the operation of said second switching means.

5. Equipment claimed in claim 1 further including:

a starting switch provided between said first and second means and said actuating means, the operation of said switch making or breaking the operative connection between said first and second means and said actuating means.

6. Equipment claimed in claim 1 in which the first and second signals stored on said sound recording media have frequencies different from each other.

7. Equipment claimed in claim 6 further including:

a means for distinguishing frequencies of said first and second signals; said means being operatively connected to said first and second means and functioning so as to apply respectively and separately said first signal to said first means and said second signal to said second means.

8. Equipment claimed in claim 7 said first means including:

first and second semiconductor switching elements electrically connected to each other, said first semiconductor element being electrically connected to said actuating means and switched over to allow the operation of said first means by the action of said actuating means;

said second semiconductor switching element being electrically connected to said means for distinguishing frequencies and responsive to said first signal for inverting said first semiconductor switching element in accordance with said first signal so as to stop the operation of said first means.

9. Equipment claimed in claim 7, said second means including:

first, second and third semiconductor switching elements electrically connected to each other;

said first semiconductor switching element being electrically connected to said actuating means and said detecting means so as to make said second means operable by the action of said actuating means and at the same time changed over so as to stop the operation of said second means in accordance with the signal produced from said detecting means, said second semiconductor switching element being electrically connected to said means for distinguishing frequencies so as to be responsive to said second signal, cooperating with said first semiconductor switching element and making said second means to operate in accordance with said second signal;

said third semiconductor switching element being electrically connected to said first means and cooperating with said first semiconductor switching element during the time in which said first means stops its operation for actuating said second means irrespective of the operation of said second semiconductor switching element.

10. Equipment claimed in claim 7, said first means including:

a semiconductor switch responsive to said first signal, said switch being electrically connected to said means for distinguishing frequencies, a mechanical switch operatively connected to said semiconductor switch, said mechanical switch actuating said first means by the action of said actuating means and stopping the operation of said first means when said semiconductor switch responds to said first signal.

11. Equipment claimed in claim 7 said second means including:

a semiconductor switch responsive to said second signal, said switch being electrically connected to said means for distinguishing frequencies, and a mechanical switch operatively connected to said mark detecting means, said switch cooperating with said semiconductor switch by the action of said actuating means to actuate said second means and stopping the operation of said second means when said detecting means detects said mark.

12. Equipment claimed in claim 7, said first means including a first semiconductor switch and a first mechanical switch, said second means including a second semiconductor switch and a second mechanical switch;

said first semiconductor switch being electrically connected to said means for distinguishing frequencies and responsive only to said first signal, said first mechanical switch being operatively connected to said first semiconductor switch and actuating said first means by the action of said actuating means and stopping the operation of said first means when said first semiconductor switch responds to said first signal, said second semiconductor switch being electrically connected to said means for distinguishing frequencies and responsive only to said second signal;

said second mechanical switch being operatively connected to said mark detecting means, cooperating with said second semi-conductor switch by the action of said actuating means for actuating said second means in accordance with said second signal and at the same time cooperating with said first mechanical switch for actuating said second means irrespectively of said second signal when the operation of said first means is stopped in accordance with said first signal and stopping the operation of said second means when said mark detecting means detects said mark;

said actuating means acting on said first and second mechanical switches so that the operation of said first and second means start jointly again when said first and second means jointly stop their operation.

13. Equipment claimed in claim 12 further including:

a starting switch connected to said first mechanical switch, said switch being capable of starting and stopping the operation of said first means by its operation irrespective of the operation of said first mechanical switch.

14. Equipment claimed in claim 12, said first and second mechanical switches including relay switching means respectively.

15. Equipment claimed in claim 1, said marks provided on said image information recording media being openings perforated in said media, said mark detecting means being a photoelectric means capable of detecting the existence of said openings.

16. Equipment for use in combination with a visual display device, a sound information recording and playback device, sound information recording media, and image information recording media for synchronizing the image information of the image information recording media with sound information of the sound information recording media, said image information recording media being displayed by the visual display device and said sound information recording media being reproduced by a recording and playback device, said equipment comprising:

said image information recording media having a plurality of frames of image information and being provided with first and second marks on said image information recording media, said first mark being provided at a position corresponding to every Nth frame of said image information, said second mark being provided at a position corresponding to the initial frame of said image information;

first means for detecting said first mark and for producing a signal when said first mark is detected;

second means for detecting said second mark and for producing a signal when said second mark is detected;

said sound information recording media having first, second and third signals stored thereon, said first signal for compensating the delay of synchronization between said image information and said sound information at every Nth frame, said first signal being stored in a position corresponding to the frame on which said first mark of said image information recording media appears, said second signal for compensating the delay of synchronization between said image information and sound information at the position of said initial frame of said image information, said second signal being stored in a position corresponding to the frame provided with said second mark on said image information recording media, said third signal for regularly changing said image information and being stored in positions corresponding to each frame of said image information;

first means responsive to said second signal and being operatively connected to said recording and playback device for controlling the operation of said device, said means stopping its operation in accordance with said second signal, said device being operative only when said means operates;

second means responsive to said first and third signals and signals from said first and second detecting means, said second means operatively connected to said visual display device for controlling the operation of said visual display device, said second means being responsive to said third signal for regularly changing said image information and also being responsive to said first signal for acting on said visual display device irrespective of said third signal so that said image information is changed without correspondence to said sound information, the action of said second controlling means being stopped when a signal is produced from said first detecting means and a signal is provided from said second detecting means; and starting means for actuating said first and second controlling means, said starting means being operatively coupled to said first and second controlling means.

17. Equipment claimed in claim 16, said starting means including:

an actuating means operatively connected to said first and second controlling means, said means for making said first and second controlling means to restart together when said both controlling means jointly stop operations; and a starting switch electrically connected to said actuating means, said switch for actuating said actuating means.

18. Equipment claimed in claim 16 said first controlling means including:

a switching means responsive to said second signal and operatively connected to said starting means, said switching means actuating said first controlling means by the action of said starting means and stopping the operation of said controlling means in accordance with said second signal.

19. Equipment claimed in claim 16, said second controlling means including:

first, second, third and fourth switching means connected so as to be in cooperative relationship with each other, said first switching means being responsive to the signal produced from said second detective means and being operatively connected to said starting means so as to cooperate with said second and third switching means by the action of said starting means, cooperating also with said second and fourth switching means for actuating said second controlling means, and stopping the operation of said second controlling means in accordance with the signal produced from said second detecting means;

said second switching means being responsive to the signal produced from said first detecting means, cooperating with said first and third switching means and also cooperating with said first and fourth switching means for actuating said second controlling means and stopping the operation of said second controlling means in accordance with the signal produced from said first detecting means;

said third switching means being responsive to said third signal so as to cooperate with said first and second switching means in accordance with said third signal for actuating said second controlling means for regularly changing said image information;

said fourth switching means being responsive to said first signal so as to cooperate with said first and second switching means in accordance with said first signal for actuating said second controlling means irrespective of said third signal.

20. Equipment claimed in claim 19, said second controlling means including:

an actuating means operatively connected to said second switching means, said actuating means restoring said switching means to the initial state when said second switching means stops the operation of said second controlling means in response to the signal produced from said first detecting means.

21. Equipment claimed in claim 19, said second controlling means including:

an actuating means operatively connected to said second and fourth switching means, said actuating means restoring both second and fourth switching means together to their initial state when said second switching means and said fourth switching means are changed over in response respectively to the signal produced from said first detecting means and said first signal.

22. Equipment claimed in claim 19, said first switching means including:

a semiconductor switch electrically connected to said second detecting means; and a mechanical switch operatively connected to said semiconductor switch and said starting means, said switch cooperating with said second and third switching means by the action of said starting means, and cooperating with said second and fourth switching means for actuating said second controlling means, and stopping the action of said second controlling means when said semiconductor switch responds to the signal produced from said second detecting means.

23. Equipment claimed in claim 19, said second switching means including:

a semiconductor switch electrically connected to said first detecting means;

a mechanical switch operatively connected to said semiconductor switch, said mechanical switch cooperating with said first and third switching means, cooperating also with said first and fourth switching means for actuating said second controlling means, and stopping the operation of said second controlling means when said semiconductor switch responds to the signal produced from said first detecting means.

24. Equipment claimed in claim 19, wherein said first, second and fourth switching means include respectively a relay switching means.

25. Equipment claimed in claim 16, wherein said first, second and third signals stored on said sound recording media have frequencies different from each other.

26. Equipment claimed in claim 25, further including:

means for distinguishing frequencies of said first, second and third signals, said means being operatively connected to said first and second controlling means for separately transmitting said second signal and said first and third signals to said first controlling means and said second controlling means respectively.

27. Equipment claimed in claim 26, said first controlling means including:

a semiconductor switch responsive to said second signal, said switch being electrically connected to said means for distinguishing frequencies;

a mechanical switch operatively connected to said semiconductor switch, said mechanical switch being operatively connected to said starting means for actuating said first controlling means by the action of said starting means and for stopping the action of said first controlling means when said semiconductor switch responds to said second signal.

28. Equipment claimed in claim 26, said second controlling means including:

a semiconductor switch electrically connected to said means for distinguishing frequencies, said switch being responsive to said third signal so as to start or stop the action of said second controlling means in accordance with said signal.

29. Equipment claimed in claim 26 said second controlling means including:

a semiconductor switch electrically connected to said means for distinguishing frequencies, said switch being responsive to said first signal, a mechanical switch operatively connected to said semiconductor switch, said mechanical switch actuating said second controlling means for changing said image information without correspondence to said sound information when said semiconductor switch responds to said first signal.

30. Equipment claimed in claim 16, wherein said first and second detecting means include respectively a photoelectric means.

31. Equipment claimed in claim 16, wherein said image information recording media include a motion picture film.

32. Equipment claimed in claim 16, wherein said image information media and said sound information recording media include respectively an endless picture film and an endless sound tape.

33. Equipment for use in combination with a visual display device, a sound information recording and playback device, an endless sound tape and an endless film for synchronizing the image information of the endless film displayed by the visual display device with the sound information of the endless sound tape corresponding to said image information and the sound information reproduced by the recording and playback device, said equipment comprising:

said endless film having a plurality of frames and being provided with first and second marks, said first mark being provided at a position corresponding to every Nth frame of said image information, said second mark being provided at a position corresponding to the last frame of said image information;

first means for detecting said first mark and for producing a signal when said first mark is detected;

second means for detecting said second mark and for producing a signal when said second mark is detected;

said endless sound tape having first, second and third signals stored thereon, said first signal for compensating the delay of synchronization between said image information and said sound information at every Nth frame of said film, said first signal being stored in a position corresponding to the frame on which said first mark of said film appears, said second signal for compensating the delay of synchronization between said image information and sound information at the position of said last frame of said film, said second signal being stored in a position corresponding to the frame provided with said second mark on said endless film, said third signal for regularly changing said image information and being stored in positions corresponding to each frame of said endless film;

signal distinguishing means for distinguishing said first, second and third signals;

first means coupled to said signal distinguishing means for controlling the operation of said recording and playback device, said first controlling means being responsive to said second signal, said first operation control means including the stopping of said recording and playback device in accordance with said second signal;

second means coupled to said signal distinguishing means and said first and second detecting means for controlling the operation of said visual display device, said second controlling means actuating said display device so that image information is regularly changed in accordance with said third signal, and actuating said display device so that said image information is changed without correspondence to said sound information in accordance with said first signal, said second controlling means also stopping the operation of said display device upon receiving a signal produced from said first detecting means and from said second detecting means; and a starting means operatively coupled to said first and second controlling means, said means for actuating said recording and playback device and said visual display device.

* * * * *